(12) United States Patent
Benkreira et al.

(10) Patent No.: US 10,936,925 B2
(45) Date of Patent: *Mar. 2, 2021

(54) MULTI-PART TRANSACTION CARD

(71) Applicant: Capital One Services, LLC, McLean, VA (US)

(72) Inventors: Abdelkader M'Hamed Benkreira, Washington, DC (US); Daniel Marsch, Arlington, VA (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,059

(22) Filed: Nov. 27, 2018

(65) Prior Publication Data

US 2020/0110976 A1    Apr. 9, 2020

Related U.S. Application Data

(63) Continuation of application No. 16/153,176, filed on Oct. 5, 2018, now Pat. No. 10,331,989.

(51) Int. Cl.
G06K 19/06    (2006.01)
G06K 19/07    (2006.01)

(52) U.S. Cl.
CPC ... G06K 19/06196 (2013.01); G06K 19/0723 (2013.01)

(58) Field of Classification Search
CPC ........... G06K 19/077; G06K 19/07732; G06K 19/07733; G06K 19/07769; G06K 19/10; G06K 19/0723; G06K 13/0875; G06K 19/005; G06K 19/06196; G06K 19/0704; G06K 19/07737; G06K 19/07327; G06K 19/07741; G06K 19/07743; G06K 19/07749; G06Q 20/3278; G06Q 20/352; G11B 33/0488

See application file for complete search history.

(56) References Cited

U.S. PATENT DOCUMENTS

| | | | |
|---|---|---|---|
| 3,583,317 A | 6/1971 | Gibson | |
| 3,605,619 A * | 9/1971 | Gilstrap | B42D 25/425 283/98 |
| 5,326,964 A | 7/1994 | Risser | |
| 5,700,037 A | 12/1997 | Keller | |
| 6,256,063 B1 | 7/2001 | Saito et al. | |
| 7,830,672 B1 | 11/2010 | Kitchen | |
| 8,328,106 B1 | 12/2012 | Trujillo | |
| 2007/0252010 A1 * | 11/2007 | Gonzalez | G11B 33/0488 235/492 |

(Continued)

*Primary Examiner* — Thien T Mai
(74) *Attorney, Agent, or Firm* — Kacvinsky Daisak Bluni PLLC

(57) ABSTRACT

A transaction card may include a body having a first part connectable with a second part, and a magnetic stripe on a first main side of the body. A first section of the magnetic stripe is provided on the first part of the body, and a second section of the magnetic stripe is provided on the second part of the body. The transaction card may further include an engagement member extending from the first part of the body for retention within a slot of the second part of the body, the slot embedded within the body between the first main side and a second main side.

20 Claims, 12 Drawing Sheets

(56) References Cited

U.S. PATENT DOCUMENTS

| | | |
|---|---|---|
| 2008/0000987 A1 | 1/2008 | Augustinowicz et al. |
| 2009/0069050 A1 | 3/2009 | Jain et al. |
| 2011/0062242 A1* | 3/2011 | Cowcher .............. G06F 9/4406 |
| | | 235/492 |

* cited by examiner

MULTI-PART TRANSACTION CARD

RELATED APPLICATIONS

This application is a continuation of U.S. patent application Ser. No. 16/153,176, entitled "MULTI-PART TRANSACTION CARD" filed on Oct. 5, 2018. The contents of the aforementioned application is incorporated herein by reference.

FIELD

Embodiments of the present disclosure relate to transaction cards and, more particularly, to transaction cards including multiple parts capable of being coupled together.

BACKGROUND

Credit cards, debit cards, gift cards, membership cards, loyalty cards, promotional cards, identification cards, etc., all of which are generally known as transaction cards, are commonly used today. Transaction cards include information for carrying out one or more specified transactions. The information is typically carried upon or within the boundaries of the card on a transaction information medium, such as a magnetic stripe, a bar code, optical storage, a computer chip, a smart chip, or the like.

Transaction cards are typically delivered to consumers via physical postal systems. As a result, transaction cards are susceptible to malicious interception by a third party. What is needed therefore, is a transaction card with enhanced security measures which prevent malicious actors from being able to compromise the transaction card by intercept a single piece of mail.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first main side and a second main side, and a magnetic stripe on the second main side of the body. A first section of the magnetic stripe is provided on a first part of the body, and a second section of the magnetic stripe is provided on a second part of the body. The first part of the body may be connectable with the second part of the body. The transaction card may further include an engagement member extending from the first part of the body for retention within a slot of the second part of the body, the slot embedded within the body between the first main side and a second main side.

In another approach according to the disclosure, a multi-part transaction card may include a body having a first part coupleable with a second part, each of the first and second parts including an outer edge and an inner edge, wherein the inner edges of the first and second parts of the body are in complementary abutment when the first and second parts are coupled together. The multi-part transaction card may further include a magnetic stripe on the body, wherein a first section of the magnetic stripe is provided on the first part of the body, and wherein a second section of the magnetic stripe is provided on the second part of the body. The multi-part transaction card may further an engagement member extending from the inner edge of the first part of the body for retention within a slot of the second part of the body, the slot embedded within the body between a first main side and a second main side.

In yet another approach according to the disclosure, a method may include providing a body of a transaction card, the body having a first part connectable with a second part. The method may further include providing a magnetic stripe on the body, wherein a first section of the magnetic stripe is provided on the first part of the body, and wherein a second section of the magnetic stripe is provided on the second part of the body. The method may further include coupling together the first and second parts of the body with an engagement member extending from the first part of the body, wherein the engagement member is retained within a slot of the second part of the body, and wherein the slot is embedded within the body between a first main side and a second main side.

BRIEF DESCRIPTION OF THE DRAWINGS

The accompanying drawings illustrate example approaches of the disclosure, including the practical application of the principles thereof, as follows.

Figure 1A:
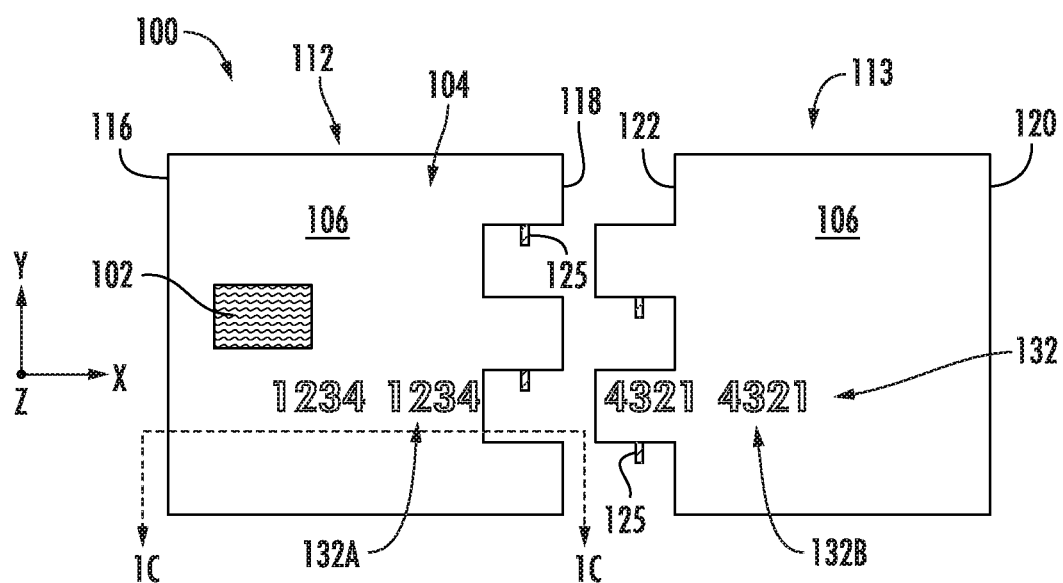
FIG. 1A is a top view illustrating a transaction card, in accordance with embodiments of the present disclosure.
Figure 1B:
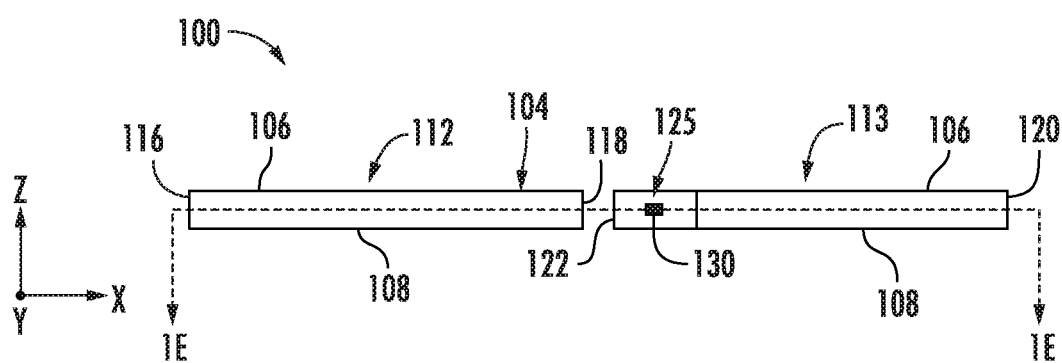
FIG. 1B is a side view of the transaction card of FIG. 1A, in accordance with embodiments of the present disclosure.
Figure 1C:
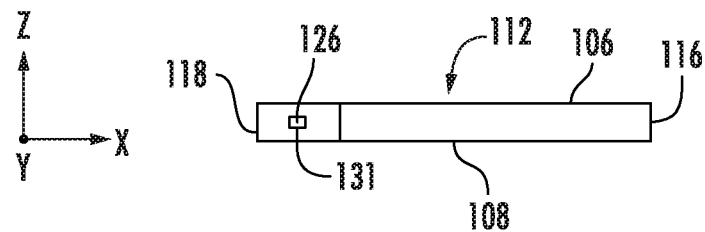
FIG. 1C is a side cross-sectional view of the transaction card along cut line 1C-1C of FIG. 1A, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards having multiple parts coupleable together to form a complete transaction card. By separating the transaction card out into two different pieces, each piece can be mailed separately to minimize interception by a third party. In example embodiments, the transaction card may have a first section of a magnetic stripe on a first part of the card, and a second section of the magnetic stripe on a second part of the card. Similarly, the card number may be split between the first and second parts of the transaction card, thus preventing malicious actors from obtaining a complete card number and/or magnetic stripe in a single piece of mail.

Referring now to FIGS. 1A-1E, an example transaction card (hereinafter "card") 100 according to embodiments of the disclosure will be described. The card 100 may be a credit or debit card, an access card, a gift card, and the like. Although non-limiting, the card 100 may be made from polyvinyl chloride (PVC), polyester or polycarbonate, and may include multiple layers.

As shown, the card 100 may include a body 104 having a first main side 106 and a second main side 108 opposite the first main side 106. Although non-limiting, the first main side 106 may correspond to a front or top side of the card 100, while the second main side 108 may correspond to a back or bottom side of the card 100. An identification chip 102 may be coupled (e.g., recessed or partially embedded) to the first main side 106 of the card 100. As used herein, the identification chip 102 may be any microprocessor device configured to exchange data electromagnetically, such as a RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

The card 100 may include a first part 112 and a second part 113. As shown, the first part 112 and the second part 113 generally make up two halves of the card 100. Although shown as being substantially equal in size/area, the first and second parts 112, 113 may be apportioned differently in other embodiments. Furthermore, the card 100 may be broken into three or more pieces in other embodiments. The first part 112 and the second part 113 may have complimentary geometries to enable connection therebetween. More specifically, the first part 112 may include a first outer edge 116 and a first inner edge 118. The second part 113 may similarly include a second outer edge 120 and a second inner edge 122. To join the first part 112 and the second part 113 of the card, the first inner edge 118 and the second inner edge 122 are brought into abutment with one another, as will be described in greater detail below.

The card 100 may include one or more engagement members 125 extending from the first part 112 and/or the second part 113 for retention within a slot 126 of an opposite part. In some embodiments, the engagement members 125 may be pins extending from the first inner edge 118 and/or the second inner edge 122. As shown, the engagement members and the slots 126 extend substantially perpendicularly to the first and second main sides 106, 108 of the card 100. When the first and second parts 112, 113 are connected, the engagement members 125 are retained within the slots 126, fully embedded within the card 100 between the first and second main sides 106, 108. In some embodiments, at least one of the engagement members 125 includes a flat section 130 (FIG. 1B) operable to engage a complimentary flat section 131 (FIG. 1C) of the slot 126. The abutting flat sections 130 and 131 prevent or minimize rotation of the first and second parts 112, 113 relatively to one another.

As best shown in FIG. 1A, the card 100 may include first identifying indicia 132, such as an account or card number, on the first main side 106 thereof. Although non-limiting, the card number may be a 16-digit number (e.g., four groups of four digits) extending across both the first and second parts 112, 113 of the card. In other embodiments, the card number may include a different number of digits. As shown, the first identifying indicia 132 may include a first section 132A located on the first part 112 of the body 104, and a second section 132B located on the second part 113 of the body 104. In the non-limiting embodiment shown, the first section 132A may include eight (8) digits of the 16-digit card number, while the second section 132B may include eight (8) digits of the 16-digit card number. In other embodiments, the card number of the first identifying indicia 132 may be split in any number of ways between the different parts of the card 100. For example, eleven (11) digits may be disposed on the first part 112, while five (5) digits are disposed on the second part 113. Because the first six digits, as read from left to right, are Issuer Identification Numbers (IIN), and the seventh digit to the second-to-last digit correspond to customer account numbers, security is increased by ensuring the customer account number is split evenly or close to evenly between the first and second parts 112, 113 of the card 100. In one non-limiting example, having between eight (8) and twelve (12) digits of the first identifying indicia 132 disposed on the first part 112 of the card 100, and the remaining number of digits on the second part 113 of the card 100, makes it more difficult for a malicious actor to determine the remaining account numbers should one part of the card 100 be compromised.

Figure 1D:
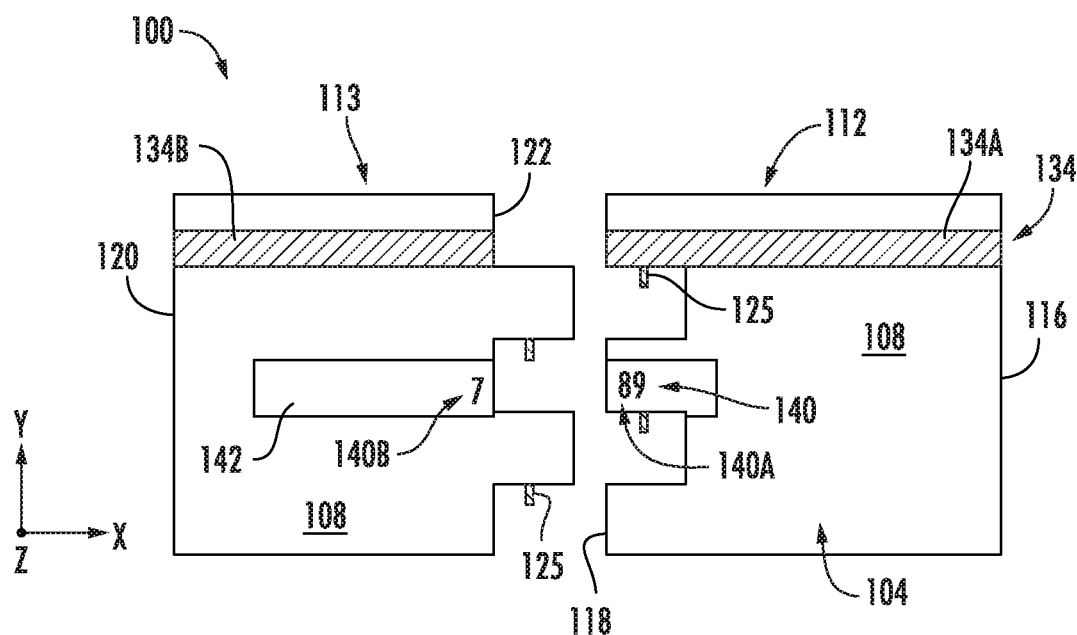
FIG. 1D is a back view of the transaction card of FIG. 1A, in accordance with embodiments of the present disclosure.
Figure 1E:
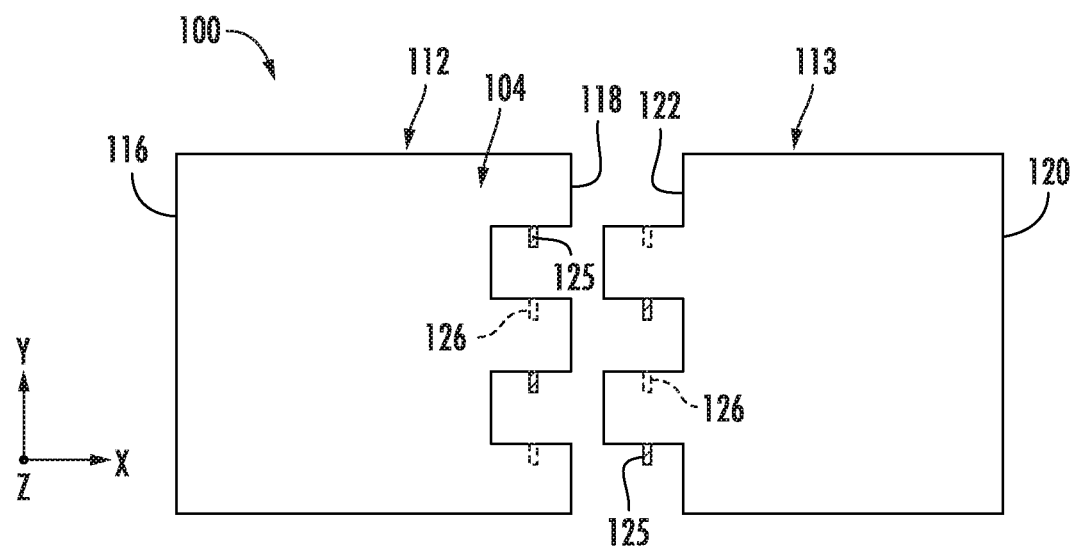
FIG. 1E is a cross-sectional view of the transaction card along cut line 1E-1E of FIG. 1B, in accordance with embodiments of the present disclosure.

As best shown in FIG. 1D, the card 100 may further include a magnetic stripe 134 provided on the second main side 108 of the body 104. In some embodiments, the magnetic stripe 134 includes a first section 134A provided on the first part 112 of the body 104 and a second section 134B provided on the second part 113 of the body 104. In some embodiments, the magnetic stripe 134 may contain cardholder data in accordance with standard protocols. For example, in some embodiments, the magnetic stripe 134 includes three tracks, often designated as track 1, track 2, and track 3. Many payment cards, such as credit cards or debit cards, have a magnetic stripe that includes two tracks, such as a magnetic stripe that includes tracks 1 and 2. Other cards have a magnetic stripe that includes three tracks. Many card readers can read a magnetic stripe that includes three tracks, and in cases where the payment card includes a magnetic stripe with only two tracks, the card reader's ability to read a third track is unused. In non-limiting embodiments, when the magnetic stripe 134 is encoded with account data of the card 100 using two tracks, the account data of the card 100 can be encoded in tracks 1 and 2. Track 3 of the magnetic stripe 134 may be unused and devoid of valid data in such a situation.

In example embodiments, the cardholder data encoded on the magnetic stripe 134 may be split between the first section 134A and the second section 134B, thus preventing the cardholder data from being properly read when the first and second parts 112, 113 of the card 100 are separated. Stated differently, the first and second sections 134A, 134B of the magnetic stripe 134 each contains an incomplete encoding. Only when the first and second parts 112, 113 of the card 100 are joined together does the encoding of the magnetic stripe 134 become unified. In some embodiments, the first and second sections 134A, 134B may connect at a low point in the encoding.

As further shown in FIG. 1D, the card 100 may include second identifying indicia 140 disposed on the second main side 108 thereof. In some embodiments, the second identifying indicia 140 may be a card verification value (CVV). Depending on the type of card, the second identifying indicia 140 may be present on or near a signature strip 142. The second identifying indicia 140 may be a 3-digit number split between the first and second parts 112, 113 of the card 100. For example, the second identifying indicia 140 may include a first section 140A (e.g., "89") disposed on the first part 112, and a second section 140B (e.g., "7") disposed on the second part 113. Separating the second identifying indicia 140 between the first and second parts 112, 113 prevents the second identifying indicia 140 from being easily known when the first and second parts 112, 113 of the card 100 are separated.

Figure 2A:
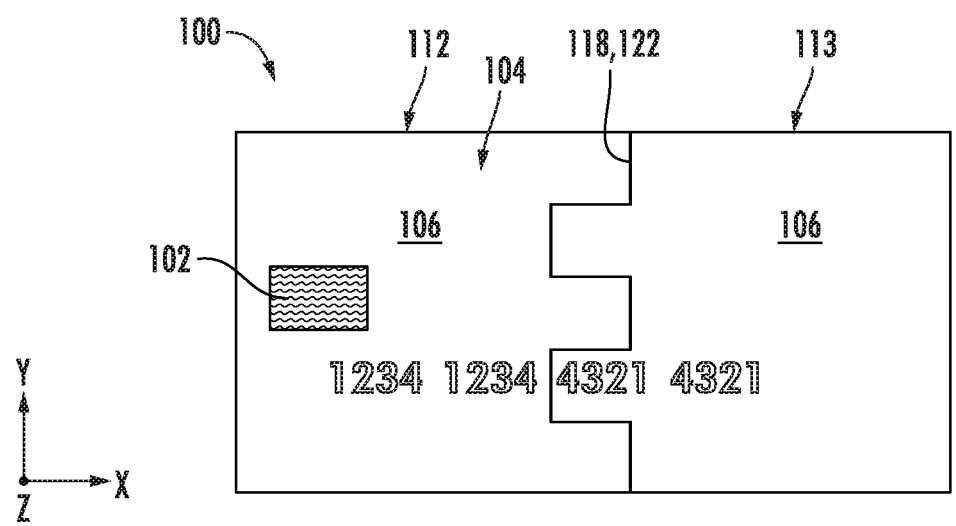
FIG. 2A is a top view of the transaction card of FIG. 1A in an assembled configuration, in accordance with embodiments of the present disclosure.
Figure 2B:
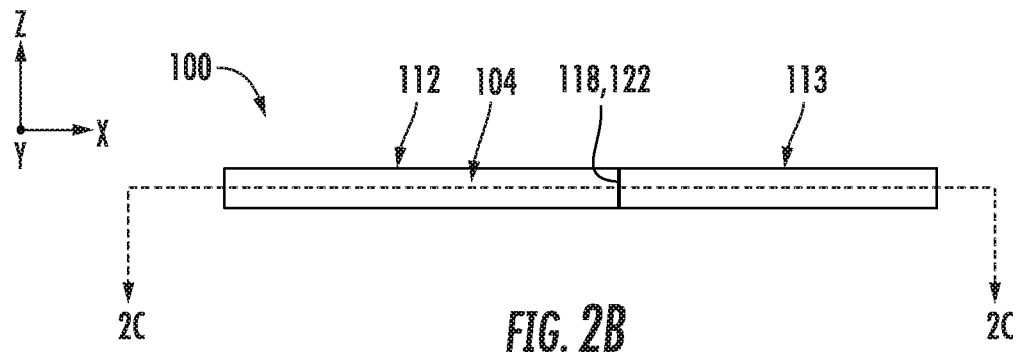
FIG. 2B is a side view of the transaction card of FIG. 2A, in accordance with embodiments of the present disclosure.
Figure 2C:
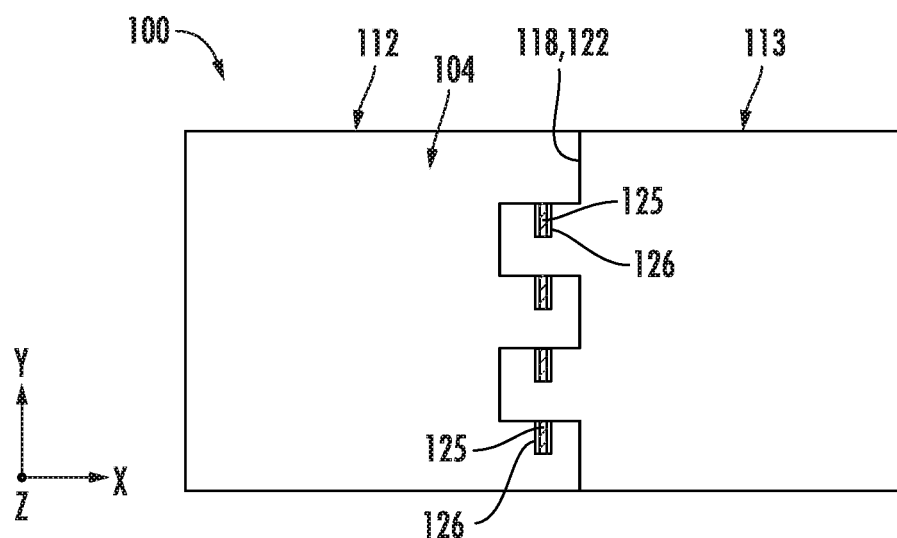
FIG. 2C is a cross-sectional view of the transaction card along cut line 2C-2C of FIG. 2B, in accordance with embodiments of the present disclosure.

FIGS. 2A-2C demonstrate the card 100 in an assembled configuration. As shown, the first part 112 and the second part 113 of the body 104 are coupled together and extend along a same plane, such as the x-y plane. The first inner edge 118 of the first part 112 and the second inner edge 122 of the second part 113 may be in complementary abutment so that substantially no gaps or spaces are present between the first and second parts 112, 113. As best shown in FIG. 2C, each of the engagement members 125 are disposed within corresponding slots 126. In some embodiments, once the engagement members 125 enter the slots 126, the first and second parts 112, 113 of the card 100 are fixed together.

Figure 3A:
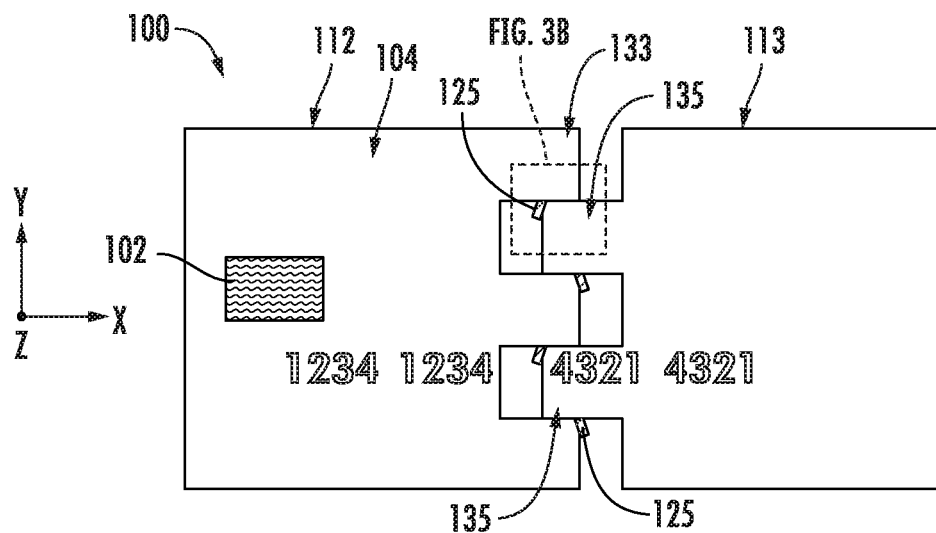
FIG. 3A and FIG. 3B demonstrate an approach for assembling a transaction card, in accordance with embodiments of the present disclosure.
Figure 3B:
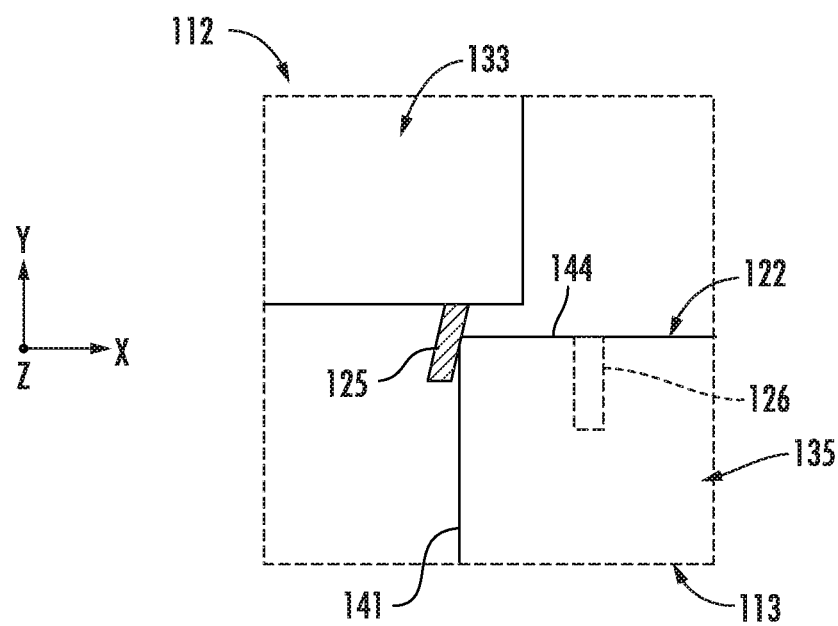

FIGS. 3A-3B demonstrate one non-limiting approach for joining together the first and second parts 112, 113 of the card 100. As shown, the card 100 may include one or more engagement members 125 extending from first overlap members 133 of the first part 112 and/or from second overlap members 135 of the second part 113, the engagement members 125 for retention within the slot(s) 126. In this embodiment, the engagement members 125 may each be a pin extending from outer surfaces of respective overlap members 133, 135 of the first and second parts 112, 113. The engagement members 125 may be a flexible/elastic spring material operable to be biased when the first and second part 112, 113 are brought together.

For example, as more clearly shown in FIG. 3B, when the second overlap member 135 of the second part 113 is brought into engagement with the first overlap member 133, a leading surface or leading edge 141 of the second inner edge 122 of the second overlap member 135 initially engages the engagement member 125. The engagement member 125 is thus biased from a first unbent position, to a second bent position. As shown, the engagement member 125 may be biased along the x-axis towards the first part 112 of the card 100. As the first and second parts 112, 113 are brought closer together, the engagement member 125 of the first overlap member 133 slides along a surface 144 of the second overlap member 135 until the engagement member 125 is aligned with the slot 126. The engagement member 125 may then enter the slot 126 and return to a pre-biased, unbent configuration. Once the engagement member 125 is retained with the slot 126, the first and second parts 112, 113 are substantially fixed together.

Figure 3C:
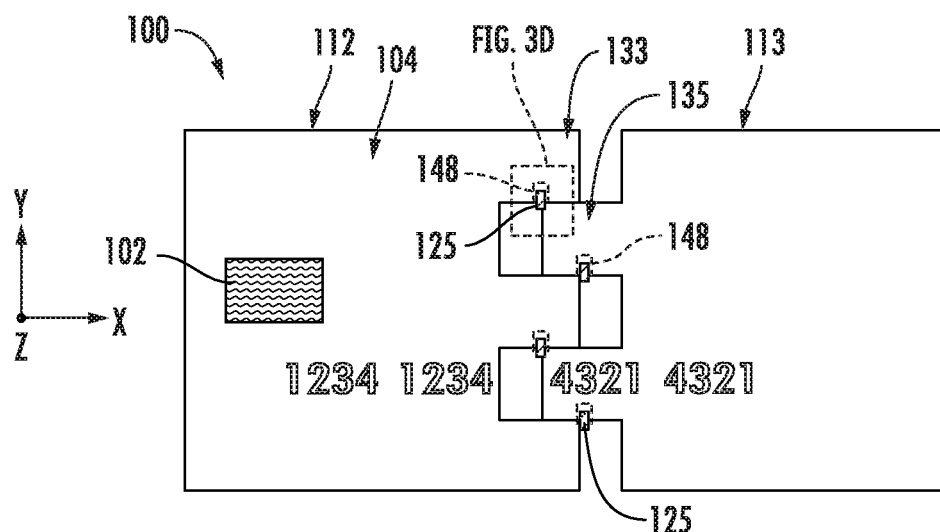
FIG. 3C and FIG. 3D demonstrate an approach for assembling a transaction card, in accordance with embodiments of the present disclosure.
Figure 3D:
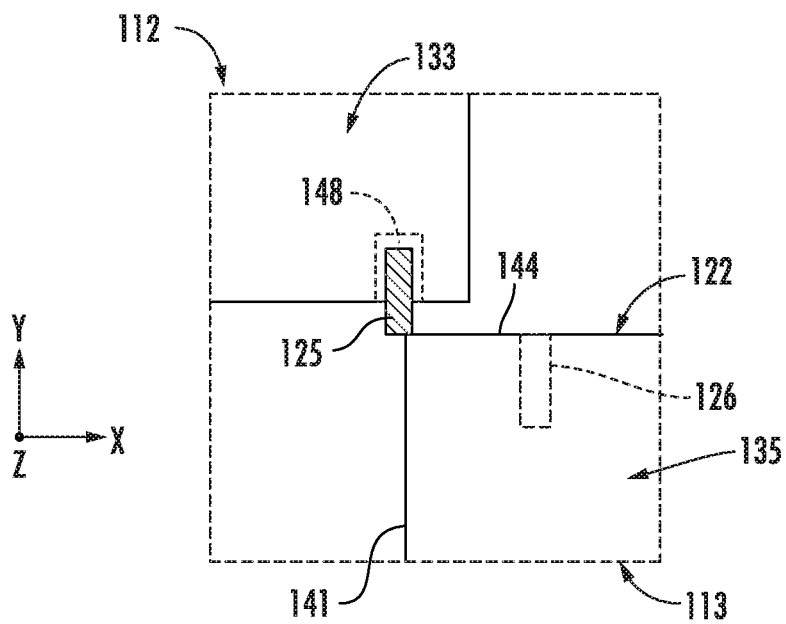

FIGS. 3C-3D demonstrate another non-limiting approach for joining together the first and second parts 112, 113 of the body 104 of the card 100. As shown, the card 100 may include one or more engagement members 125 extending from first overlap members 133 of the first part 112 and/or from second overlap members 135 of the second part 113 for retention within the slot(s) 126. In this embodiment, the engagement members 125 may each be a pin extending from outer surfaces of respective overlap members 133, 135 of the first and second parts 112, 113. The engagement members 125 may be rigid or semi-rigid metal pins slidable within a recess 148 of the card 100.

As more clearly shown in FIG. 3D, as the second overlap member 135 of the second part 113 of the card 100 is brought into engagement with the first overlap member 133, the leading edge 141 of the second inner edge 122 of the second part 113 initially engages the engagement member 125. The engagement member 125 is thus biased from a first extended position, to a second recessed position. For example, the engagement member 125 may be biased along the y-axis into the recess 148 of the first part 112 in response to contact with the surface 144 of the second overlap member 135. As the first and second parts 112, 113 are brought closer together, the engagement member 125 slides along the surface 144 of the second overlap member 135 until the engagement member 125 is aligned with the slot 126 of the second part 113. Because the engagement member 125 is no longer constrained by the surface 144, the engagement member 125 will enter the slot 126 and return to the first extended position. As will be explained in further detail below, the engagement member 125 may be biased into the first extended position by a spring or other similar device. Once the engagement member 125 is retained with the slot 126, the first and second parts 112, 113 are substantially fixed together.

Figure 4A:
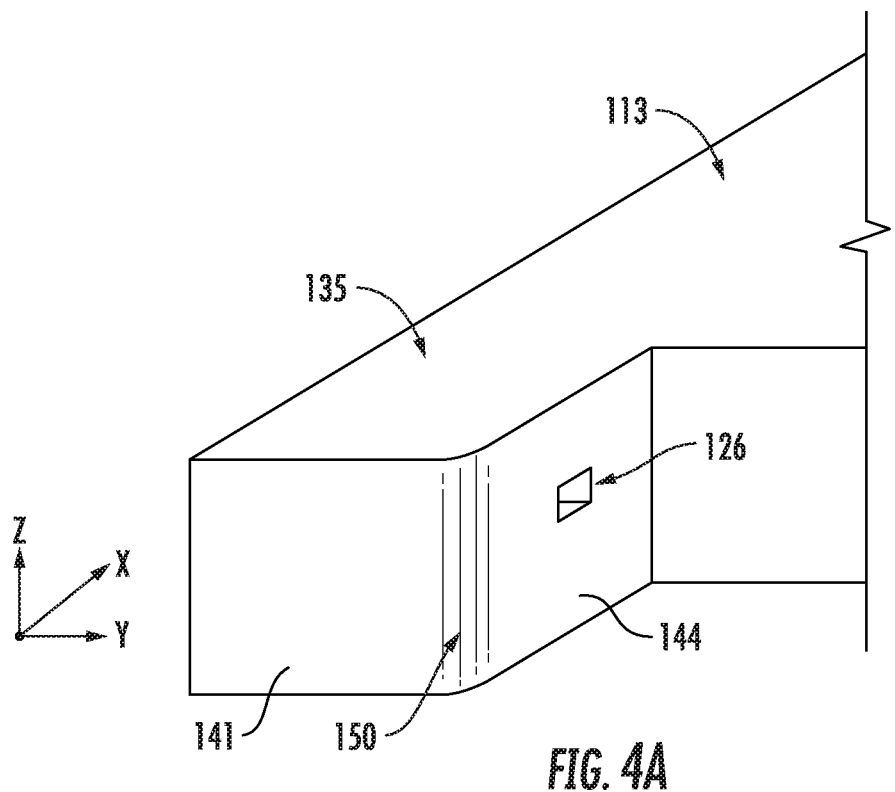
FIG. 4A shows an example overlapping member including a slot for receiving an engagement member, in accordance with embodiments of the present disclosure.
Figure 4B:
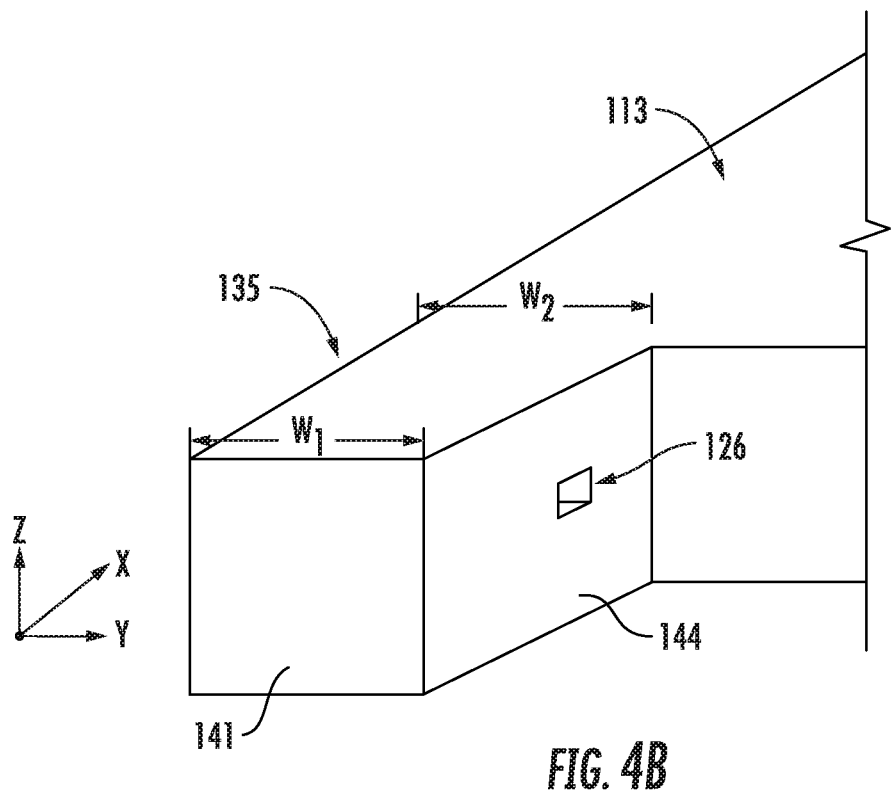
FIG. 4B shows an example overlapping member including a slot for receiving an engagement member, in accordance with embodiments of the present disclosure.
Figure 4C:
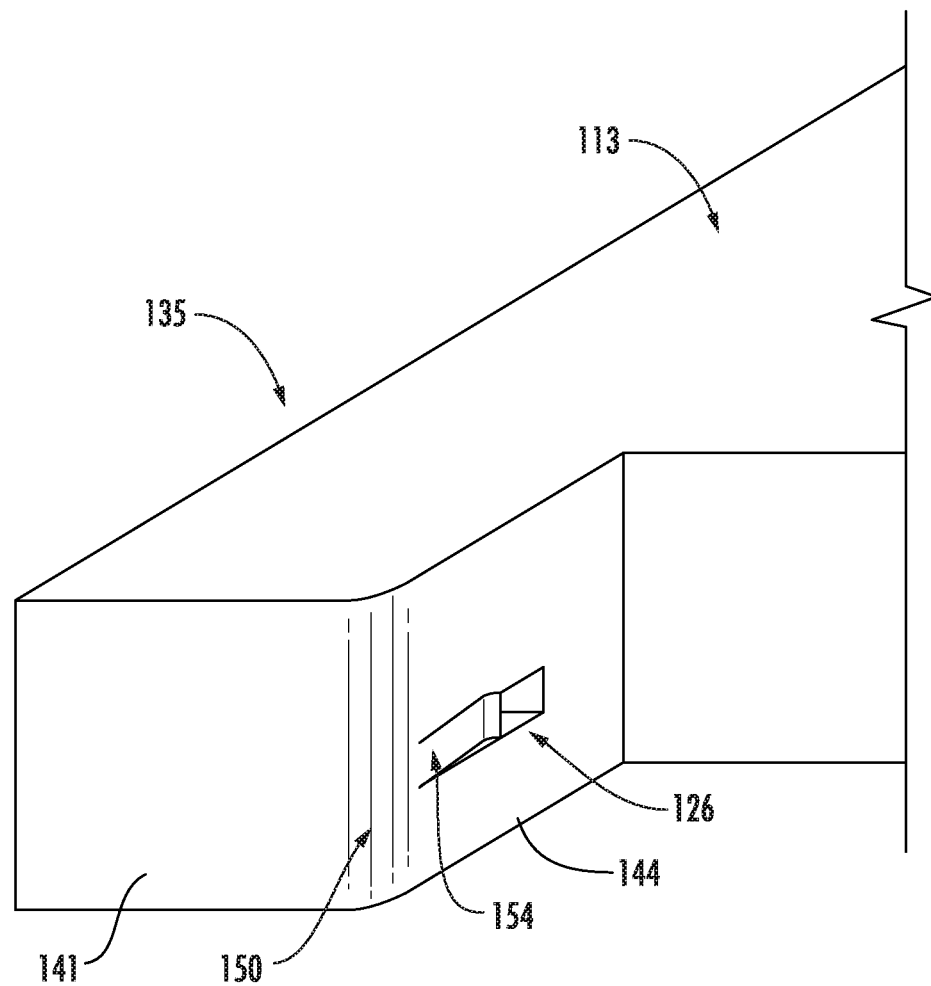
FIG. 4C shows an example overlapping member including a slot for receiving an engagement member, in accordance with embodiments of the present disclosure.

Turning now to FIGS. 4A-4C, various examples of overlap members of the card 100 will be described in greater detail. For the sake of clarity, only a single overlap member 135 of the second part 113 will be shown and described. However, it will be appreciated that the overlap members 133 of the first part 112 may include similar features. As shown in FIG. 4A, the second overlap member 135 of the second part 113 may include the leading surface or leading edge 141 connected to the surface 144, wherein the slot 126 is provided in the surface 144. In this embodiment, a beveled edge 150 may connect the leading edge 141 and the surface 144. The beveled edge 150 is operable to initially engage the engagement member 125. The beveled edge 150 may be curved or rounded to better guide the engagement member 125 along the surface 144 towards the slot 126. The beveled edge 150 may be particularly advantageous in the case the engagement member 125 is a recessable pin.

As shown in FIG. 4B, the surface 144 may be sloped. For example, a width 'W1' at a free end of the second overlap member 135 may be smaller/less than a width 'W2' at a base of the second overlap member 135. Providing the surface 144 with a slope may reduce the likelihood of the leading edge 141 of the second overlap member 135 impacting a side of the engagement member 125, particularly when the engagement member 125 is a rigid recessable pin.

As shown in FIG. 4C, the second overlap member 135 of the second part 113 may include a channel 154 for receiving and guiding the engagement member 125 into the slot 126. The channel 154 may be recessed into the surface 144. As shown, the channel 154 may be oriented perpendicular, or substantially perpendicular, to the slot 126. By providing the channel 154 within the surface, alignment of the engagement member 125 and the slot 126 may be improved. Although non-limiting, the second overlap member 135 may also include the beveled edge 150 between the leading edge 141 and the surface 144.

Figure 5:
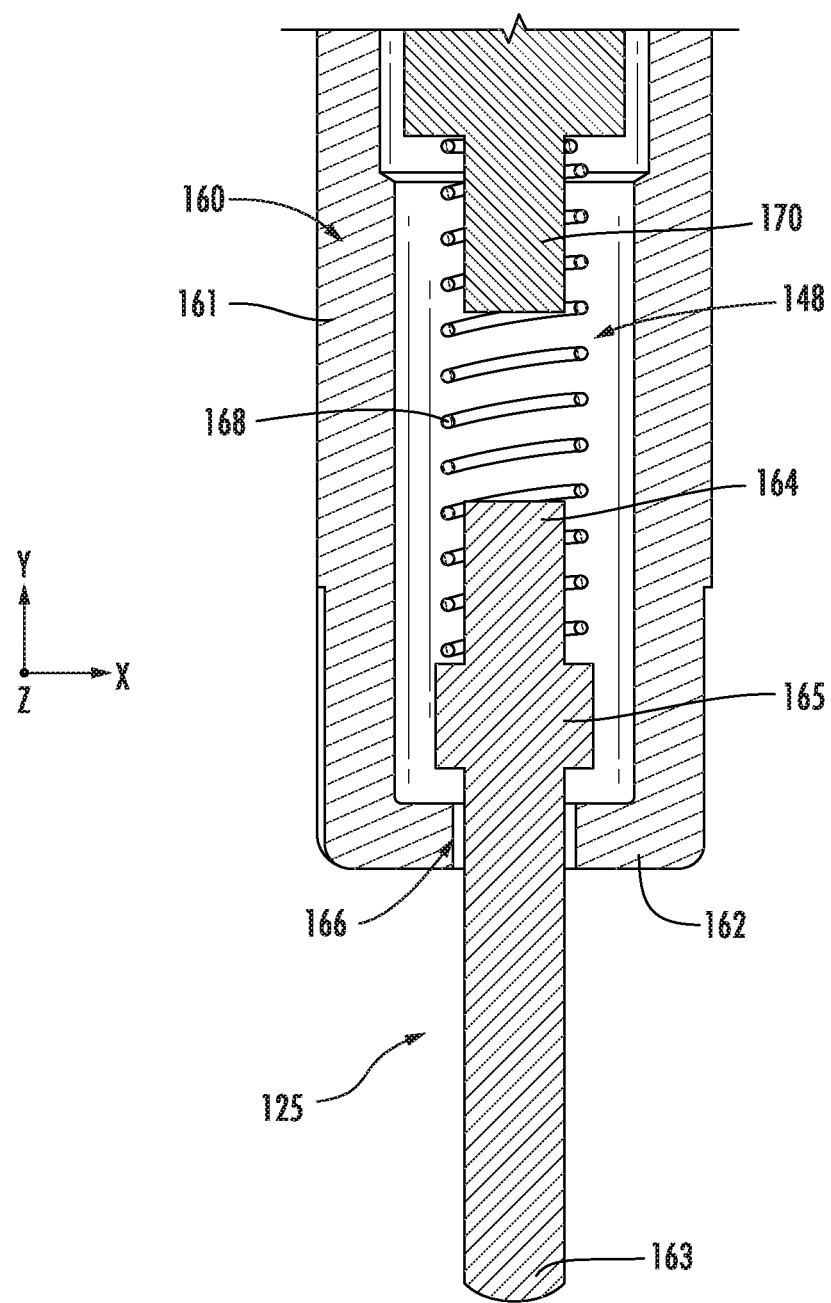
FIG. 5 is a side cross-sectional view of an example engagement member of the transaction card, in accordance with embodiments of the present disclosure.

Turning now to FIG. 5, a non-limiting embodiment of the engagement member 125 will be described in greater detail. The engagement member 125 may be a pin recessable within the recess 148. As shown, the recess 148 may be defined by a structure 160 including a sidewall 161 and an end wall 162. The engagement member 125 may include a distal end 163 opposite a proximal end 164. A collar 165 of the engagement member 125 may prevent the engagement member 125 from exiting the structure 160 through an opening 166 in the end wall 162 in response to a spring force from a spring 168. As shown, a first end of the spring 168 may extend around the proximal end 164 of the engagement member 125 and engage the collar 165. A second end of the spring 168 may extend around a support 170 extending towards the engagement member 125 within the recess 148. It will be appreciated that other spring or biasing devices are possible within the scope of the present embodiments.

Figure 6A:
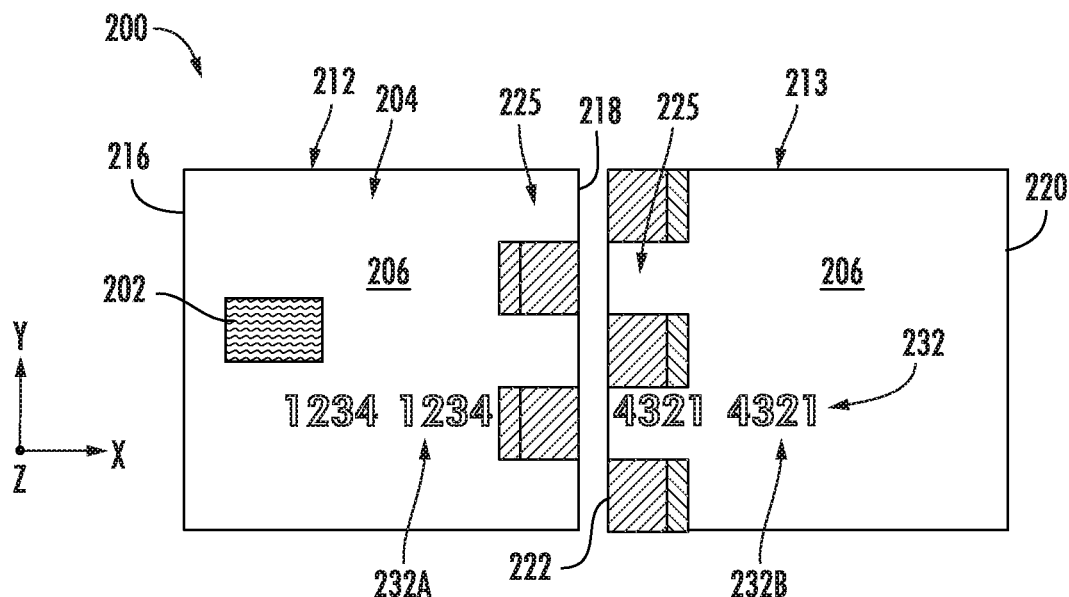
FIG. 6A is a top view illustrating a transaction card, in accordance with embodiments of the present disclosure.
Figure 6B:
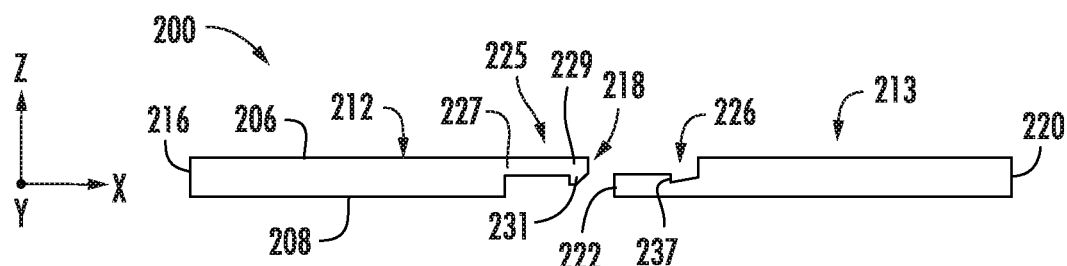
FIG. 6B is a side view of the transaction card of FIG. 6A in a detached configuration, in accordance with embodiments of the present disclosure.
Figure 6C:
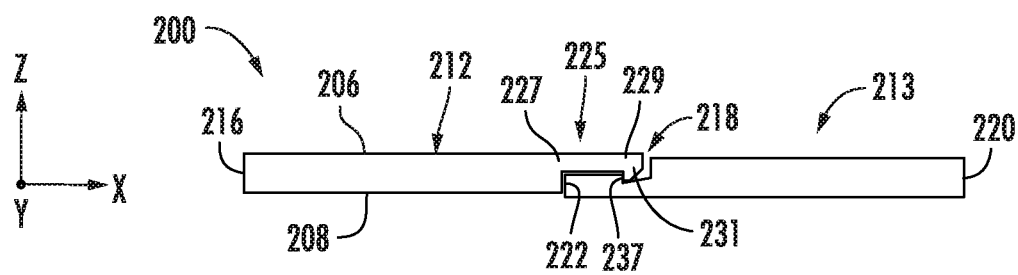
FIG. 6C is a side view of the transaction card of FIG. 6A in an attached configuration, in accordance with embodiments of the present disclosure.

Referring now to FIGS. 6A-6C, an example transaction card (hereinafter "card") 200 according to embodiments of the disclosure will be described. As shown, the card 200 may include a body 204 having a first main side 206 and a second main side 208 opposite the first main side 206. Although non-limiting, the first main side 206 may correspond to a front or top side of the card 200, while the second main side 208 may correspond to a back or bottom side of the card 200. An identification chip 202 may be coupled (e.g., recessed or partially embedded) to the first main side 206 of the card 200.

The card 200 may include a first part 212 and a second part 213. As shown, the first part 212 and the second part 213 generally make up two halves of the card 200. Although shown as being substantially equal in size/area, the first and second parts 212, 213 may be apportioned differently in other embodiments. The first part 212 and the second part 213 may have complimentary geometries to enable connection therebetween. More specifically, the first part 212 may include a first outer edge 216 and a first inner edge 218. The second part 213 may similarly include a second outer edge 220 and a second inner edge 222. To join the first part 212 and the second part 213 of the card, the first inner edge 218 and the second inner edge 222 are brought into abutment with one another, as will be described in greater detail below.

The card 200 may include one or more engagement members 225 extending from the first part 212 and/or the second part 213 for retention within a slot 226 of the opposite part. In some embodiments, the engagement members 225 may each be a hook, clasp, or grapple having a fixed end 227 and a free end 229. The free end 229 may include a tab 231 extending therefrom, the tab 231 operable to engage a retention surface 237 of the slot 226. Separation of the first and second parts 212, 213 (e.g., in opposite directions along the x-axis) may be prevented by the tab 231 in abutment with the retention surface 237.

In this embodiment, the engagement members 225 may overlap, e.g., in the z-direction, each of the slots 226. Once the card 200 is assembled, as shown in FIG. 6C, the first main side 206 of the first part 212 extends along a same plane, e.g., the x-y plane, as the first main side 206 of the second part 213. Similarly, the second main side 208 of the first part 212 extends along a same plane, e.g., the x-y plane, as the second main side 208 of the second part 213.

The card 200 may include one or more identifying indicia, such as an account or card number 232, on the first main side 206 thereof. As described above, the card number 232 may include a first section 232A located on the first part 212 of the body 204, and a second section 232B located on the second part 213 of the body 204. In the non-limiting embodiment shown, the first section 232A may include eight (8) digits of the 16-digit card number 232, while the second section 232B may include eight (8) digits of the 16-digit card number 232. In other embodiments, the card number 232 may be split in any number of ways between the different parts of the card 200. As described above, security of the card 200 may be increased by ensuring the customer account number of the card number 232 is split evenly or close to evenly between the first and second parts 212, 213 of the card 200.

Although not shown, the card 200 may further include a magnetic stripe and additional identifying indicia, such as CVV number, along the second main side 208 thereof. As described above, the magnetic stripe of the card 200 may include a first section provided on the first part 212 of the body 204 and a second section provided on the second part 213 of the body 204. Only when the first and second parts 212, 213 of the card 200 are brought together may information from the magnetic stripe be properly read. Similarly, the CVV may be separated between the first and second parts 212, 213 of the card 200.

Figure 7A:
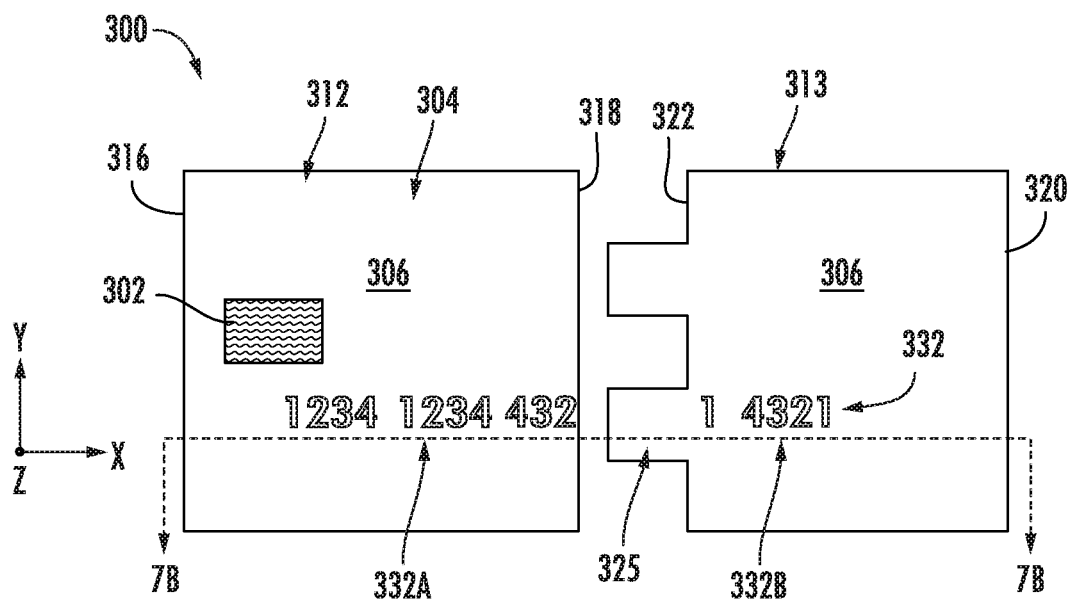
FIG. 7A is a top view illustrating a transaction card, in accordance with embodiments of the present disclosure.
Figure 7B:
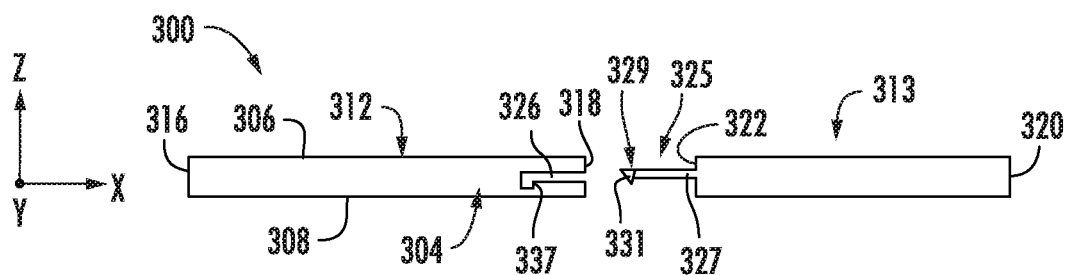
FIG. 7B is a side view of the transaction card of FIG. 7A in a detached configuration, in accordance with embodiments of the present disclosure.
Figure 7C:
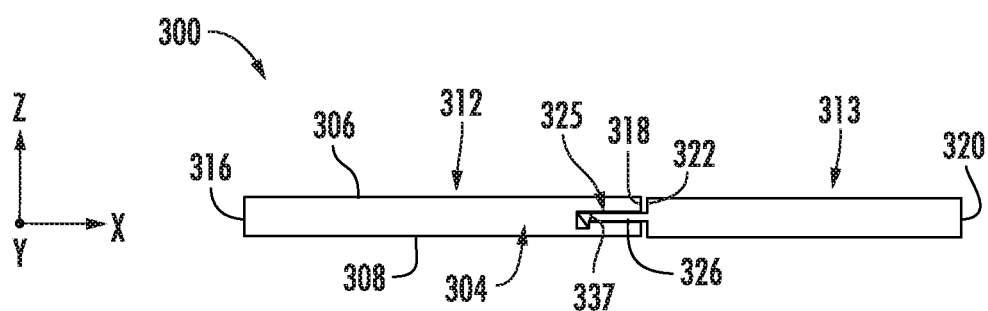
FIG. 7C is a side view of the transaction card of FIG. 7A in an attached configuration, in accordance with embodiments of the present disclosure.

Referring now to FIGS. 7A-7C, an example transaction card (hereinafter "card") 300 according to embodiments of the disclosure will be described. As shown, the card 300 may include a body 304 having a first main side 306 and a second main side 308 opposite the first main side 306. Although non-limiting, the first main side 306 may correspond to a front or top side of the card 300, while the second main side 308 may correspond to a back or bottom side of the card 300. An identification chip 302 may be coupled (e.g., recessed or partially embedded) to the first main side 306 of the card 300.

The card 300 may include a first part 312 and a second part 313. As shown, the first part 312 and the second part 313 may have complimentary geometries to enable connection therebetween. More specifically, the first part 312 may include a first outer edge 316 and a first inner edge 318. The second part 313 may similarly include a second outer edge 320 and a second inner edge 322. To join the first part 312 and the second part 313 of the card, the first inner edge 318 and the second inner edge 322 are brought into abutment with one another.

The card 300 may include one or more engagement members 325 extending from the first part 312 and/or the second part 313 for retention within a slot 326 of the opposite part. In some embodiments, the engagement members 325 may each be a hook, clasp, or grapple having a fixed end 327 and a free end 329. The free end 329 may include a tab 331 extending therefrom, the tab 331 operable to engage a retention surface 337 of the slot 326. Separation of the first and second parts 312, 313 may be prevented once the tab 331 is in abutment with the retention surface 337.

As shown, the engagement members 325 and the slots 326 extend substantially perpendicularly to the first and second main sides 306, 308 of the card 300. When the first and second parts 312, 313 are connected, the engagement members 325 are retained within the slots 326, fully embedded within the card 300 between the first and second main sides 306, 308. In this embodiment, the engagement members 325 of the second part 313 may be sandwiched within the body 304 of the first part 312, e.g., in the z-direction. Once the card 300 is assembled, as shown in FIG. 7C, the first main side 306 of the first part 312 extends along a same plane, e.g., the x-y plane, as the first main side 306 of the second part 313. Similarly, the second main side 308 of the first part 312 extends along a same plane, e.g., the x-y plane, as the second main side 308 of the second part 313.

The card 300 may include one or more identifying indicia, such as an account or card number 332, on the first main side 306 thereof. As described above, the card number 332 may include a first section 332A located on the first part 312 of the body 304, and a second section 332B located on the second part 313 of the body 304. The card number 332 may be split in any number of ways between the different parts of the card 300. As described above, security of the card 300 may be increased by ensuring the customer account number of the card number 332 is split evenly or close to evenly between the first and second parts 312, 313 of the card 300.

Although not shown, the card 300 may further include a magnetic stripe and additional identifying indicia, such as CVV number, along the second main side 308 thereof. As described above, the magnetic stripe of the card 300 may include a first section provided on the first part 312 of the body 304 and a second section provided on the second part 313 of the body 304. Only when the first and second parts 312, 313 of the card 300 are brought together may the magnetic stripe be properly read. Similarly, the CVV may be separated between the first and second parts 312, 313 of the card 300.

Figure 8:
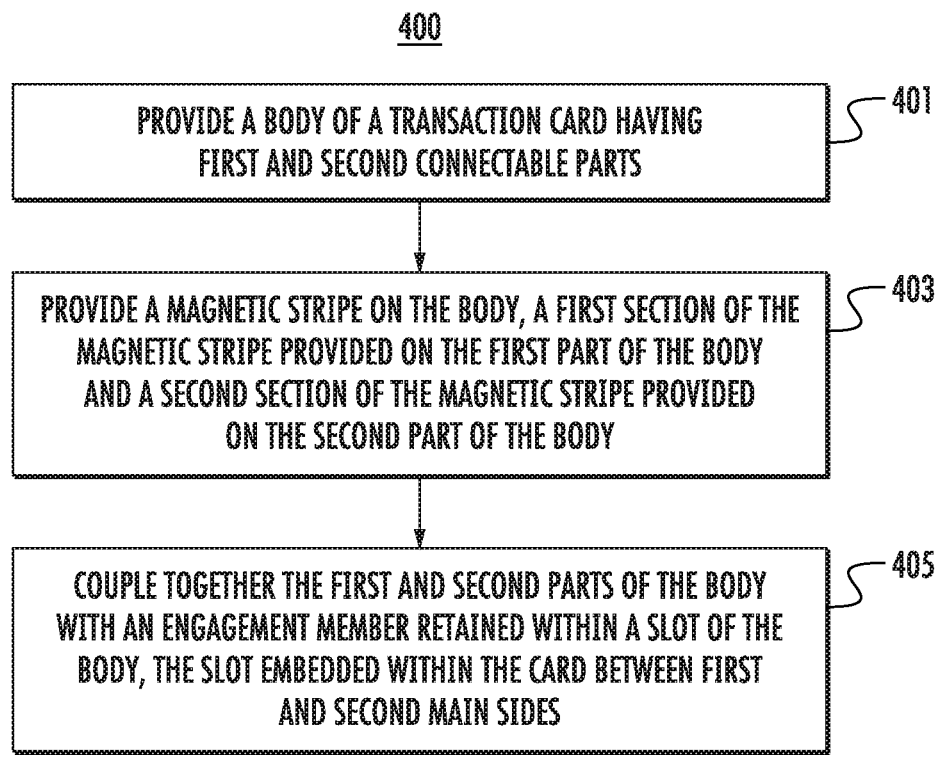
FIG. 8 illustrates a flowchart for performing methods in accordance with embodiments of the present disclosure.

Turning now to FIG. 8, a method 400 according to embodiments of the present disclosure will be described. At block 401, the method 400 may include providing a body of a transaction card, the body having a first part connectable with a second part. In some embodiments, the transaction card may have first indicia, such as a card number, on a first main side thereof. In some embodiments, the transaction card may have second indicia, such as a CVV number, on a second main side thereof.

At block 403, the method 400 may include providing a magnetic stripe on the body, wherein a first section of the magnetic stripe is provided on the first part of the body, and wherein a second section of the magnetic stripe is provided on the second part of the body. In some embodiments, the magnetic stripe is provided on a second main side of the card.

At block 405, the method 400 may include coupling together the first and second parts of the body with an engagement member extending from one or more of the first and second parts of the body. The engagement member from one part of the body is retained within a slot of the opposite part of the body. The slot may be embedded within the body between the first main side and the second main side of the body. In some embodiments, the engagement member is a hook, clasp, or a grapple including a tab for engaging a surface of the slot to secure the first and second parts of the card together. In some embodiments, the engagement member is a pin. The pin may be a flexible or elastic member operable to be biased between first and second positions. In some embodiments, the pin is slidable within a recess of the body.

In some embodiments, coupling together the first and second parts of the card includes engaging the engagement member with a surface of the opposite part of the body, and biasing the engagement member from a first position to a second position. The engagement member then is further biased from the second position to the first position to arrange the engagement member within the slot.

In summation, embodiments described herein advantageously provide a multi-part transaction card. Separately supplying different parts of a same transaction card to a consumer makes it more difficult to compromise a card via mail theft, as the malicious user would have to intercept multiple pieces of mail, potentially at multiple locations. Once both parts of the card are received by the consumer, the consumer may assemble the card using the approaches described herein. The card will then be fully functional and ready for use.

Disclosed embodiments herein include cards and methods for assembling cards, such as the transaction cards 100, 200, and 300 described above. The term "transaction card," as used herein, refers to any physical card product that is configured to provide information, such as financial information (e.g., card numbers, account numbers, account balance, etc.), quasi-financial information (e.g., rewards balance, discount information, etc.), and/or individual-identifying information (e.g., name, address, etc.), when the card is read by a card reader. Examples of transaction cards include credit cards, debit cards, gift cards, rewards cards, frequent flyer cards, merchant-specific cards, discount cards, etc., but are not limited thereto. The term "transaction card" may include an identification card such as a passport card, a driver's license, an entry point access card, or the like. The physical properties of the transaction card (e.g., size, flexibility, location of various components included in the card) may meet the various international standards, including, e.g., IS O/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

In some embodiments, the transaction cards 100, 200, 300 may further include a transaction component disposed on or in a transaction card frame. As used herein, a "transaction component" may be one or more devices and/or elements configured to receive, store, process, provide, transfer, send, delete, and/or generate information. For example, transaction component may be a microchip (e.g., an Europay, MasterCard, and Visa (EMV) chip), a communication device (e.g., Near Field Communication (NFC) antenna, Bluetooth® device, WiFi device), a magnetic stripe, a barcode, Quick Response (QR) code, or a combination thereof.

The transaction cards 100, 200, 300 may be part of a transaction system configured to conduct transaction. In some embodiments, a financial service provider system may provide a transaction card to a customer for use in conducting transactions associated with a financial service account held by the customer. For example, the customer may use the transaction card at a merchant location to make a purchase. During the course of the purchase, information may be transferred from the transaction card to a merchant system (e.g., a point of sale device). The merchant system may communicate with the financial service provider system via a network to verify the information and to complete or deny the transaction. For example, the merchant system may receive account information from the transaction card. The merchant system may transmit the account information and a purchase amount, among other transaction information, to the financial service provider system. The financial service provider system may settle the transaction by transferring funds from the customer's financial service account to a financial service account associated with the merchant.

While the transaction system and the transaction card are described in relation to transactions that involve customers, merchants, and financial service providers, it should be understood that these entities are used only as an example to illustrate one environment in which transaction cards, such as transaction cards 100, 200, and 300, may be used. Moreover, it should be understood that the transaction card is not limited to financial products and may be any physical card product that is configured to provide information to another device. For example, the transaction card may be an identification card configured to provide information to a device in order to identify the holder of the card (e.g., driver's license) or provide information about the holder of the card (e.g., insurance card).

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, transaction cards 100, 200, and 300 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for transaction cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 400 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 400 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
    a body having a first main side and a second main side;
    a magnetic stripe on the second main side of the body, wherein a first section of the magnetic stripe is provided on a first part of the body, wherein a second section of the magnetic stripe is provided on a second part of the body, and wherein the first part of the body is connectable with the second part of the body;
    an engagement member extending from the first part of the body for retention within a slot of the second part of the body, the slot located between the first main side and the second main side, wherein the slot is open only along the first main side and includes a base surface having a first section recessed to a first depth relative to a plane defined by the first main side, and a second section extending from the first section, the second section recessed to a second depth relative to the plane, and wherein the first depth is different than the second depth; and
    first identifying indicia on the first main side, wherein a first section of the first identifying indicia is located on the first part of the body, and wherein a second section of the first identifying indicia is located on a second engagement member of the second part of the body.

2. The transaction card of claim 1, wherein the second section of the first identifying indicia is located on an exterior surface of the second engagement member of the second part of the body.

3. The transaction card of claim 1, further comprising second identifying indicia on the second main side, wherein a first section of the second identifying indicia is located on the first part of the body, and wherein a second section of the second identifying indicia is located on the second part of the body.

4. The transaction card of claim 1, each of the first and second parts of the body including an outer edge and an inner edge, wherein the inner edges of the first and second parts of the body are in abutment when the first part is connected with the second part.

5. The transaction card of claim 4, wherein the engagement member extends from the inner edge of the first part of the body.

6. The transaction card of claim 1, the engagement member partially overlapping with the second part of the body.

7. The transaction card of claim 1, the engagement member comprising:
    a fixed end and a free end; and
    a tab extending from the free end, the tab operable to engage a retention surface of the slot.

8. The transaction card of claim 7, wherein the retention surface defines a plane oriented approximately perpendicular to the first main side and the second main side of the body.

9. The transaction card of claim 1, wherein the second engagement member extends from the second part of the body for retention within a second slot of the first part of the body, the second slot located between the first main side and the second main side.

10. The transaction card of claim 1, wherein the slot is recessed into the first main side of the body.

11. A multi-part transaction card, comprising:
    a body having a first part coupleable with a second part, each of the first and second parts including an outer edge and an inner edge, wherein the inner edges of the first and second parts of the body are in complementary abutment when the first and second parts are coupled together;
    a magnetic stripe on the body, wherein a first section of the magnetic stripe is provided on the first part of the body, and wherein a second section of the magnetic stripe is provided on the second part of the body;
    an engagement member extending from the inner edge of the first part of the body for retention within a slot of the second part of the body, the slot recessed into a first main side of the body, wherein the slot is open only along the first main side and includes a base surface having a first section recessed to a first depth relative to a plane defined by the first main side, and a second section extending from the first section, the second section recessed to a second depth relative to the plane, and wherein the first depth is different than the second depth; and
    first identifying indicia on the first main side, wherein a first section of the first identifying indicia is located on the first part of the body, and wherein a second section of the first identifying indicia is located on a second engagement member of the second part of the body.

12. The multi-part transaction card of claim 11, wherein the second section of the first identifying indicia is located on an exterior surface of the second engagement member of the second part of the body.

13. The multi-part transaction card of claim 11, further comprising second identifying indicia on a second main side of the body, wherein a first section of the second identifying indicia is located on the first part of the body, and wherein a second section of the second identifying indicia is located on the second part of the body.

14. The multi-part transaction card of claim 11, the engagement member comprising:
    a fixed end extending from the inner edge;
    a free end opposite the fixed end; and
    a tab extending from the free end, the tab operable to engage a retention surface of the slot.

15. The multi-part transaction card of claim 14, wherein the retention surface defines a plane oriented approximately perpendicular to the first main side of the body.

16. The multi-part transaction card of claim 13, wherein the second engagement member extends from the second part of the body for retention within a second slot of the first part of the body, the second slot located between the first main side and the second main side.

17. A method, comprising:
    providing a body of a transaction card, the body having a first part connectable with a second part;

providing a magnetic stripe on the body, wherein a first section of the magnetic stripe is provided on the first part of the body, and wherein a second section of the magnetic stripe is provided on the second part of the body;

coupling together the first and second parts of the body with an engagement member extending from the first part of the body, wherein the engagement member is retained within a slot of the second part of the body, and wherein the slot is positioned between a first main side of the body and a second main side of the body, wherein the slot is open only along the first main side and includes a base surface having a first section recessed to a first depth relative to a plane defined by the first main side, and a second section extending from the first section, the second section recessed to a second depth relative to the plane, and wherein the first depth is different than the second depth; and providing first identifying indicia on the first main side, wherein a first section of the first identifying indicia is located on the first part of the body, and wherein a second section of the first identifying indicia is located on a second engagement member of the second part of the body.

18. The method of claim 17, further comprising providing the second section of the first identifying indicia on an exterior surface of the second engagement member of the second part of the body.

19. The method of claim 17, further comprising:
inserting the engagement member into the slot; and
engaging a retention surface of the slot with a tab of the engagement member to secure the first and second parts of the transaction card together, wherein the retention surface defines a plane oriented approximately perpendicular to the first main side and the second main side of the body.

20. The method of claim 17, further comprising providing the second engagement member extending from the second part of the body for retention within a second slot of the first part of the body, the second slot located between the first main side and the second main side.

* * * * *